United States Patent
Martyn et al.

(10) Patent No.: US 7,962,399 B2
(45) Date of Patent: Jun. 14, 2011

(54) REFRESHING DISPLAYED QUOTES FOR AUTOMATED MARKET SYSTEM

(75) Inventors: Peter Martyn, Ridgewood, NJ (US); Daniel F. Moore, New Haven, CT (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 1643 days.

(21) Appl. No.: 10/302,769

(22) Filed: Nov. 21, 2002

(65) Prior Publication Data

US 2004/0019551 A1   Jan. 29, 2004

Related U.S. Application Data

(63) Continuation-in-part of application No. 10/206,397, filed on Jul. 25, 2002.

(51) Int. Cl.
*G06Q 40/00* (2006.01)

(52) U.S. Cl. ............................................. 705/37; 705/35

(58) Field of Classification Search ...................... 705/37
See application file for complete search history.

(56) References Cited

U.S. PATENT DOCUMENTS

| | | | |
|---|---|---|---|
| 5,101,353 A | 3/1992 | Lupien et al. | |
| 5,812,988 A | 9/1998 | Sandretto | |
| 6,035,287 A | 3/2000 | Stallaert et al. | |
| 6,157,914 A | 12/2000 | Seto et al. | |
| 6,317,728 B1 | 11/2001 | Kane | |
| 6,405,180 B2 | 6/2002 | Tilfors et al. | |
| 6,421,653 B1 | 7/2002 | May | |
| 6,442,533 B1 | 8/2002 | Hinkle | |
| 6,996,539 B1 * | 2/2006 | Wallman | 705/36 T |
| 7,167,844 B1 | 1/2007 | Leong et al. | |
| 7,181,424 B1 | 2/2007 | Ketchum et al. | |
| 7,246,092 B1 * | 7/2007 | Peterson et al. | 705/37 |
| 2001/0034686 A1 | 10/2001 | Eder | |
| 2002/0023043 A1* | 2/2002 | Samukawa et al. | 705/37 |
| 2002/0156716 A1 | 10/2002 | Adatia | |
| 2003/0083973 A1 | 5/2003 | Horsfall | |
| 2003/0225671 A1 | 12/2003 | Miller et al. | |
| 2003/0229566 A1 | 12/2003 | Moore et al. | |
| 2003/0229568 A1 | 12/2003 | Richmann et al. | |

FOREIGN PATENT DOCUMENTS

EP   0 407 026 A2   5/1990

OTHER PUBLICATIONS

Securities and Exchange Commission, Proposed Rule Change, NASD,Inc., Feb. 5, 1999, 61 pp.
Federal Register, vol. 63. No. 48, pp. 12124-12140.
NASD Working Paper 98-01. J.W. Smith, pp. 1-54.

(Continued)

*Primary Examiner* — James A Kramer
*Assistant Examiner* — James A Vezeris
(74) *Attorney, Agent, or Firm* — Fish & Richardson P.C.

(57) ABSTRACT

A method for managing display of quotes for securities in an electronic market includes entering a quote into a system for trading securities, a portion of the entered quote being displayable and another portion of the entered quote being held as reserved quote interest, executing a portion of the displayable quote portion against interest in the market, aggregating an unexecuted displayable quote portion, with a portion of the reserved quote, if the unexecuted displayable quote portion is less than a round lot, and displaying the aggregate.

30 Claims, 9 Drawing Sheets

OTHER PUBLICATIONS

"A Taxonomy of Automated Trade Execution Systems;" I. Domowitz, pp. 607-631.
"Formally Specifying. An Automated Trade Execution System," M. Reck, pp. 245-252.
"The Evolution of Etectronic Markets,", A. Picot et al., pp. 1-30.
US 00/26149, International Search Report, pp. 1-6.
SR-NASD-99-53—Amendment No. 1, NASD, Oct. 26, 1999, 26 pages.
SR-NASD-99-53—Amendment No. 2, NASD, Oct. 29, 1999, 1 page.
SR-NASD-99-53—Amendment No. 3 and Response to Comments, NASD, Mar. 22, 2000, 39 pages.
SR-NASD-99-53—Amendment No. 4, NASD, Mar. 23, 2000, 53 pages.
SR-NASD-99-53—Amendment No. 5 and Second Response to Comments, NASD, May 16, 2000, 35 pages.
Sr-NASD-99-53—Amendment No. 6, NASD, Jul. 6, 2000, 29 pages.
SR-NASD-99-53—Securities and Exchange Commission, Proposed Rule Change, Amendment No. 8, NASD, Oct. 20, 2000, 123 pages.
SR-NASD-99-53—Amendment No. 9, NASD, Jan. 8, 2001, 3 pages.

* cited by examiner

REFRESHING DISPLAYED QUOTES FOR AUTOMATED MARKET SYSTEM

RELATED APPLICATIONS

This application is a continuation-in-part application of U.S. patent application Ser. No. 10/206,397, Filed on Jul. 25, 2002, and entitled "TRADING ACTUAL SHARES OF A SECURITY IN A ROUND-LOT-BASED SYSTEM", assigned to the assignee of the present invention and incorporated herein by reference.

BACKGROUND

This invention relates to trading systems particularly financial trading systems.

Electronic equity markets, such as The Nasdaq Stock Market® collect, aggregate, display pre-trade information to market participants. Electronic equity markets also provide trading platforms through which market participants may access liquidity indicated in the marketplace. In some types of markets customer orders are entered by broker/dealers or equivalents and traded against other orders or quotes that are displayed by market makers or electronic commerce networks (ECN's). Sometimes orders are for what is commonly referred to as an odd lot, e.g., an order that is not a multiple of 100 shares.

Some systems include a separate odd lot process to execute orders for odd lots or mixed lots. Due to the separate odd lot processing, market participants may not get the best executions and the odd lots prices are not displayed in a round-lot-based system.

SUMMARY

According to an aspect of the present invention, a method for managing display of quotes for securities in an electronic market, includes entering a quote into a system for trading securities, a portion of the entered quote being displayable and another portion of the entered quote being held as reserved quote interest, executing a portion of the displayable quote portion against interest in the market, aggregating an unexecuted displayable quote portion, with a portion of the reserved quote, if the unexecuted displayable quote portion is less than a round lot, and displaying the aggregate.

According to an additional aspect of the present invention, a computer program product residing on a computer readable medium includes instructions for managing display of quotes for securities in an electronic market, the instructions cause a computer to enter a quote into a system for trading securities, a first portion of the entered quote being displayable and a second, different portion of the entered quote being held as reserved quote interest, execute a portion of the displayable quote portion against interest in the market, aggregate an unexecuted displayable quote portion, with a portion of the reserved quote, if the unexecuted displayable quote portion is less than a round lot, and display the aggregate.

According to an additional aspect of the present invention, a managing process for managing display of quotes for securities in an electronic market includes a quote entering process to enter a quote into a system for trading securities, a portion of the entered quote being displayable and another portion of the entered quote being held as reserved quote interest, an executing process to execute a portion of the displayable quote portion against interest in the market, an aggregating process to aggregate an unexecuted displayable quote portion, with a portion of the reserved quote, if the unexecuted displayable quote portion is less than a round lot, and a display process to display the aggregate.

One or more of the following features may also be included.

The unexecuted displayable quote portion may be aggregated with the portion of the reserved quote that has a selected size. The unexecuted displayable quote portion may be aggregated such that the aggregate has a selected size. The portion of the reserve quote aggregated may be a round lot. The aggregate may be a round lot. The aggregate may be a mixed lot. The executing, aggregating, and displaying of the aggregate may be repeated. A portion of the reserved quote portion may be executed against interest in the market if the displayable quote portion is exhausted. The portion of the displayable quote portion may be executed against interest in the market prior to the executing of the portion of the reserved quote portion.

One or more of the following advantages may be provided by one or more aspects of the present invention.

The invention provides a market participant improved manageability of the displayed portion of a quote and the portion of the quote that is available for execution but not displayed. By allowing the market participant to select a particular round lot size for replenishing the displayed quote portion, accounting complexities are reduced since the displayed quote is in round lots. Also, by replenishing and continuously displaying quotes in round lots, market participants that are only familiar with lot-based systems are not confused by mixed or odd lots being displayed.

DETAILED DESCRIPTION

Figure 1:
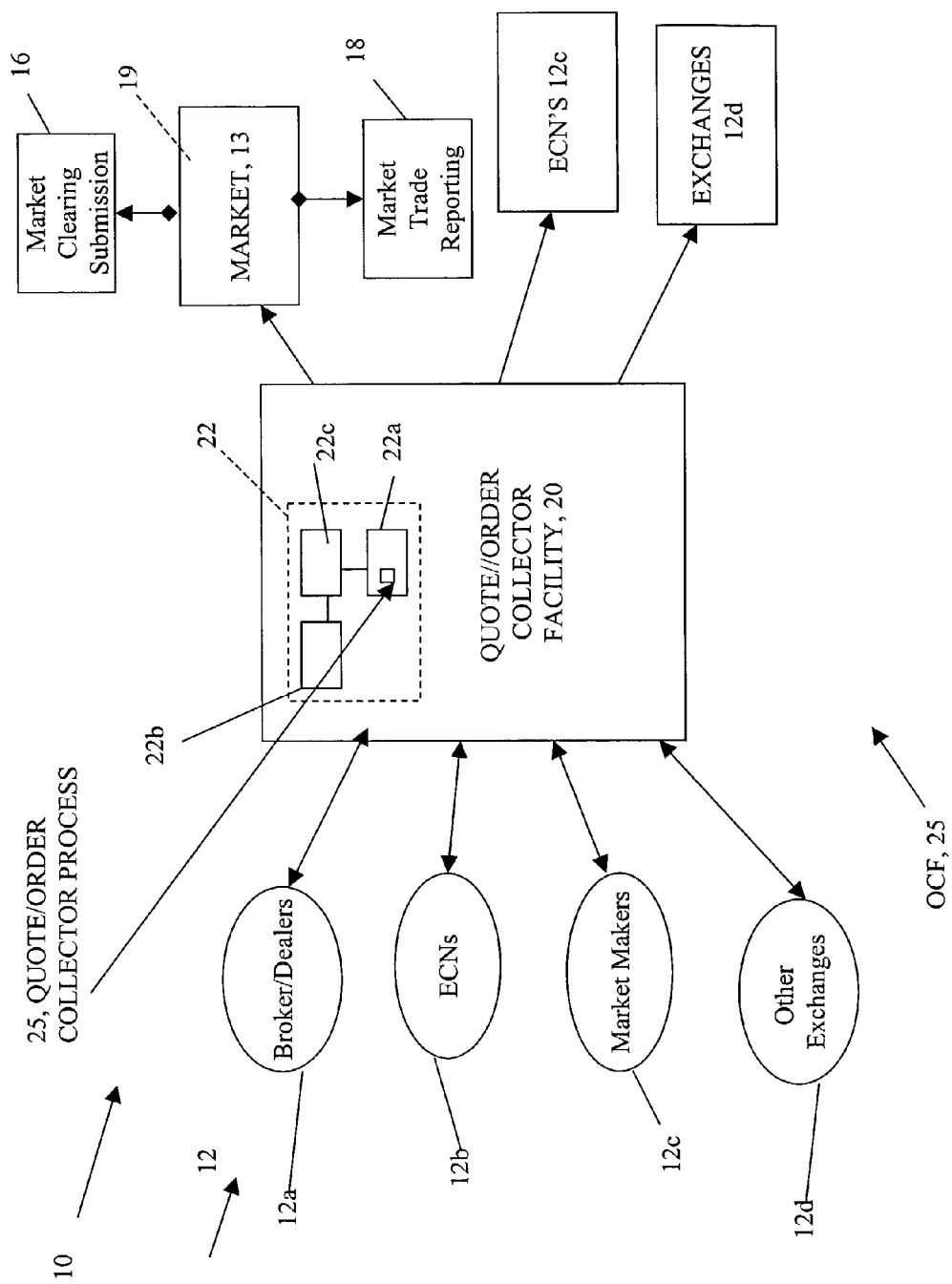
FIG. 1 is a block diagram of a market system.

Referring to FIG. 1, an electronic market 10 is shown. The electronic market 10 includes client systems 12 that access a central quote/order collector facility 20. The client systems 12 can be broker/dealer systems 12a, electronic communication networks (ECN's) 12b, market-marker systems 12c, and other exchanges 12d. The connections can use existing Nasdaq protocols such as SelectNet®, Small Order Execution Systems$^{SM}$ (SOES$^{SM}$), and or equivalent. The client systems 12 include a processor, memory and a storage device, e.g., a client workstation or personal computer (all not shown) that can include a client process to enter quotes/orders into the electronic market system. The quote/order collector facility 20 causes the order execution or order delivery systems (e.g., SOES$^{SM}$ and SelectNet®) to deliver executions or orders to a market that is coupled to a clearing system 16 and a reporting system 18. It also causes delivery of executions or routing of orders to the ECN's 12*c*, depending on the status of the ECN, and routing of orders or executions to other markets and exchanges 12*d*.

The quote/order collector facility 20 is comprised of one or preferably a plurality of server computers generally denoted as 22 including a processor 22*a*, main memory 22*b* and storage 22*c*. The storage system 22*c* includes quote/order collector process 25 that is executed in memory 22*b*. In general, server 22 is a complex computer server, the details of which are not important to an understanding of the present invention.

The quote/order collector facility 25 collects pre-trade information in the form of quotes or orders. For example, each market maker can send a proprietary quote, i.e., a quote that represents its own trading interest. In some embodiments the market maker can send an agency quote that represents trading interest of a sponsored entity. Entering quotes are limited to registered market makers 12*b* and ECNs 12*c* and possible UTP Exchanges 12*d*. For any given stock, a registered market maker or ECN may directly enter a non-marketable order, i.e., quote into the system 20 on behalf of its own account or for the account of a customer, or it may sponsor the direct entry of an order by its customer. All sponsored quotes are sent to the quote/order collector facility 20 under the name of the sponsoring market maker or ECN. Every registered market maker or ECN will be permitted to submit an unlimited number of non-marketable quotes to the system 20.

Figure 1A:
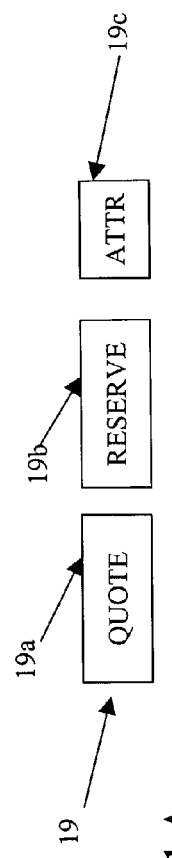
FIG. 1A is a diagram showing a format for quotes.

As shown in FIG. 1A, each quote 19 submitted to the system can include a display quote size 19*a*, a reserve size 19*b* and an indication 19*c* (ATTR) of whether the quote size is attributable or non-attributable. Quote size 19*a* when attributable based on indicator 19*c*, is directly attributable to the market maker or ECN, and is placed next to its unique market participant ID, and is displayed in a "current quote" montage. Quote size 19*b* when non-attributable is sized that the market maker or ECN wishes to display to the marketplace through an aggregate montage of the order display window. This quote size 19*a* is not attributable to the market maker or ECN until it is executed. Reserve size 19*b* is liquidity that is not displayed to the marketplace but is immediately accessible through the quote/order collector facility 20. In order to use reserve size 19*b*, a market maker can be required to have a minimum amount displayed in the aggregate quote size 19*a* without or with attributable indicator 19*c* and negotiation quote with attributable indicator 19*c* asserted.

A broker/dealer can receive an order from a customer. The broker/dealer can send that order to the order collector facility 20 to be executed with quotes that are posted by electronic communication networks, market makers or other markets. In this embodiment, orders of broker/dealers are not posted as quotes.

Order Collector Facility

Figure 2A:
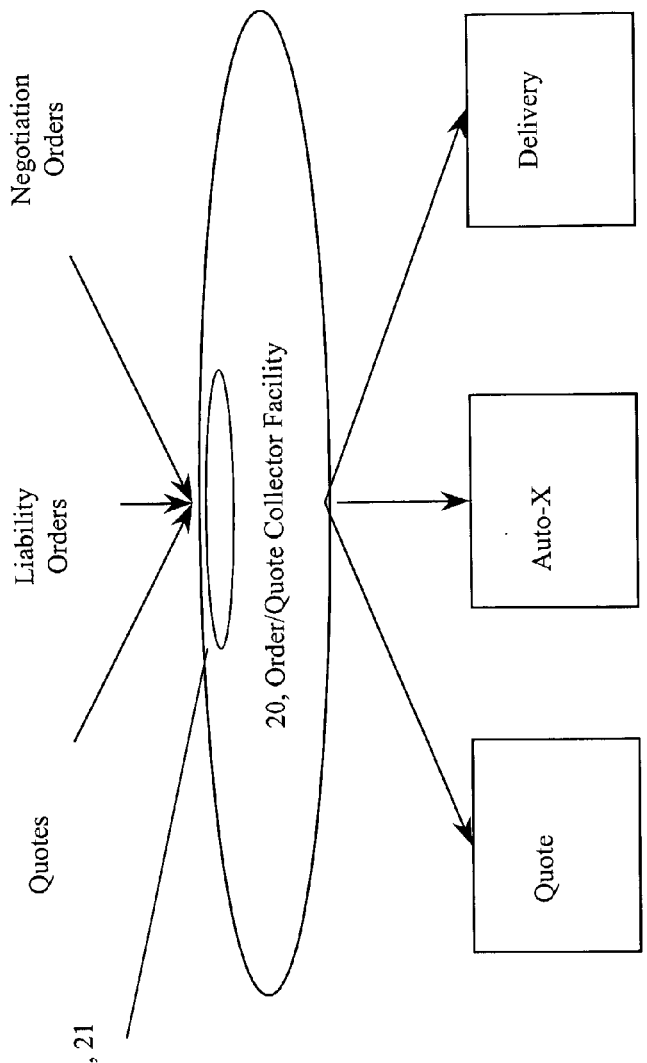
FIG. 2A is a block diagram showing arrangement of a quote/order collector facility.

Referring to FIG. 2A, the quote/order collector facility 20 receives quotes, liability orders, (non-liability orders) and directed orders from market participants. The quote/order collector facility 20 allows a quote/order to be displayed in the market, and also allows for marketable orders to be executed or routed to market participants.

The order quote collector facility 20 also includes an interface 21 that couples the order collector facility 20 to a plurality of order delivery systems. For example, the interface 21 can couple the order quote collector facility 20 to an order execution system, e.g., the Small Order Execution Systems$^{SM}$ (SOES$^{SM}$) and to a negotiation system, e.g., SelectNet®. The interface 21 would provide access to information contained in order flow delivered via the delivery systems to a quote/order collector process 25 described in conjunction with FIG. 2B.

In general, the electrical and logical functions which comprise the interface 21 can be similar to the ones currently existing in the SOES$^{SM}$/SelectNet® systems or equivalents. The interface 21 or the process 25 would extract information from the quotes and make that information available to the quote/order collector process 25. The quote/order collector process 25 extracts information and process orders in a unified manner to allow the order collector system 20 to be a unifying point of collection of all orders, which are sent to the market 10.

The interface 21 can also be used to route executions of liability orders back to market participants whose quotes/orders were executed against and can deliver orders for negotiation against market participants whose quotes are selected for further negotiation via the SelectNet® system or equivalent.

Figure 2B:
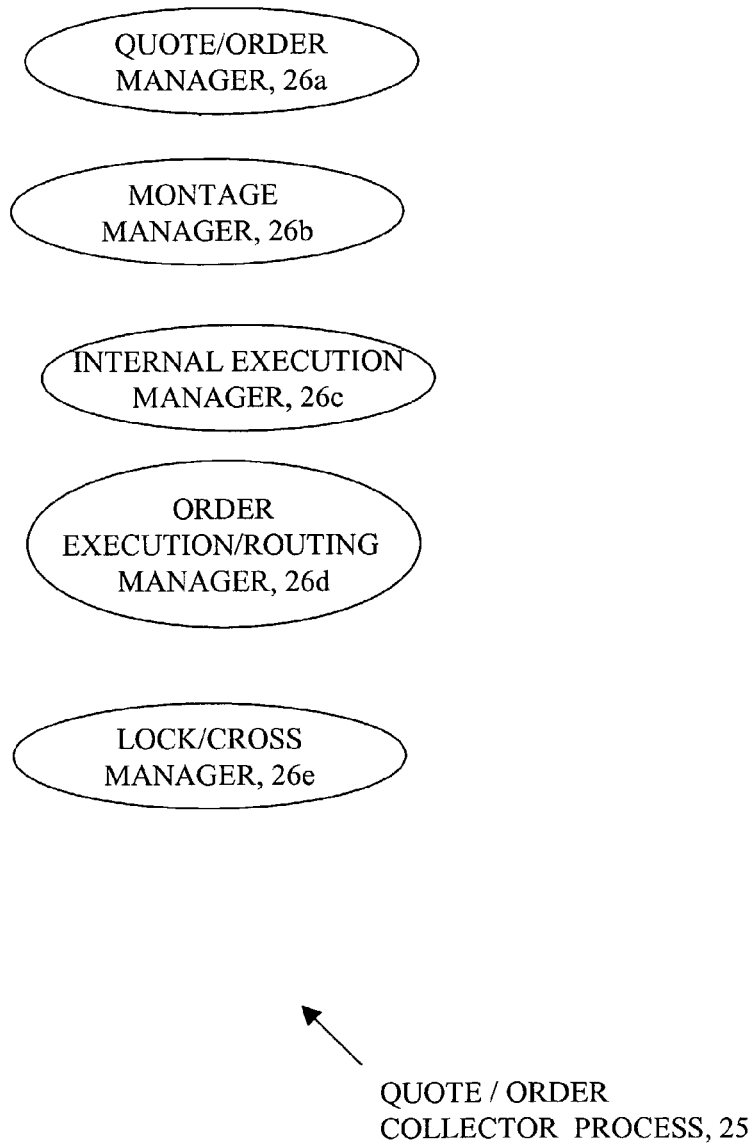
FIG. 2B is a logic view of functions in the quote/order collector facility.

Referring to FIG. 2B, the quote/order collector process ("OCP") 25 is shown. The quote/order collector process 25 provides transmission of multiple orders or quotes at multiple price levels by Quoting Market Participants to a quotation manager 26*a*. The quote/order manager 26*a* provides a unified point of entry of quotes and orders from disparate delivery systems into the quote/order collector facility 20 to access quotes/orders displayed (as either attributable or non-attributable) in both the aggregate montage and current quote montage. The quote/order manager 26*a* manages multiple quotes/orders and quotes/orders at multiple price levels and uses a montage manager 26*b* to display (either in the Aggregate montage or in the current quote montage) the orders/quotes consistent with an order's/quote's parameters. The order collector process 25 also includes an internal execution process manager 26*c* to match off executions for quoting market participants at the best bid/offer. The order collector system 20 also includes an order routing/execution manager 26*d* provides a single point delivery of executions or routing of orders, which substantially eliminates potential for dual liability. The quote/order collector process 25 also includes a lock/cross quote manager 26*e*.

Figure 3A:
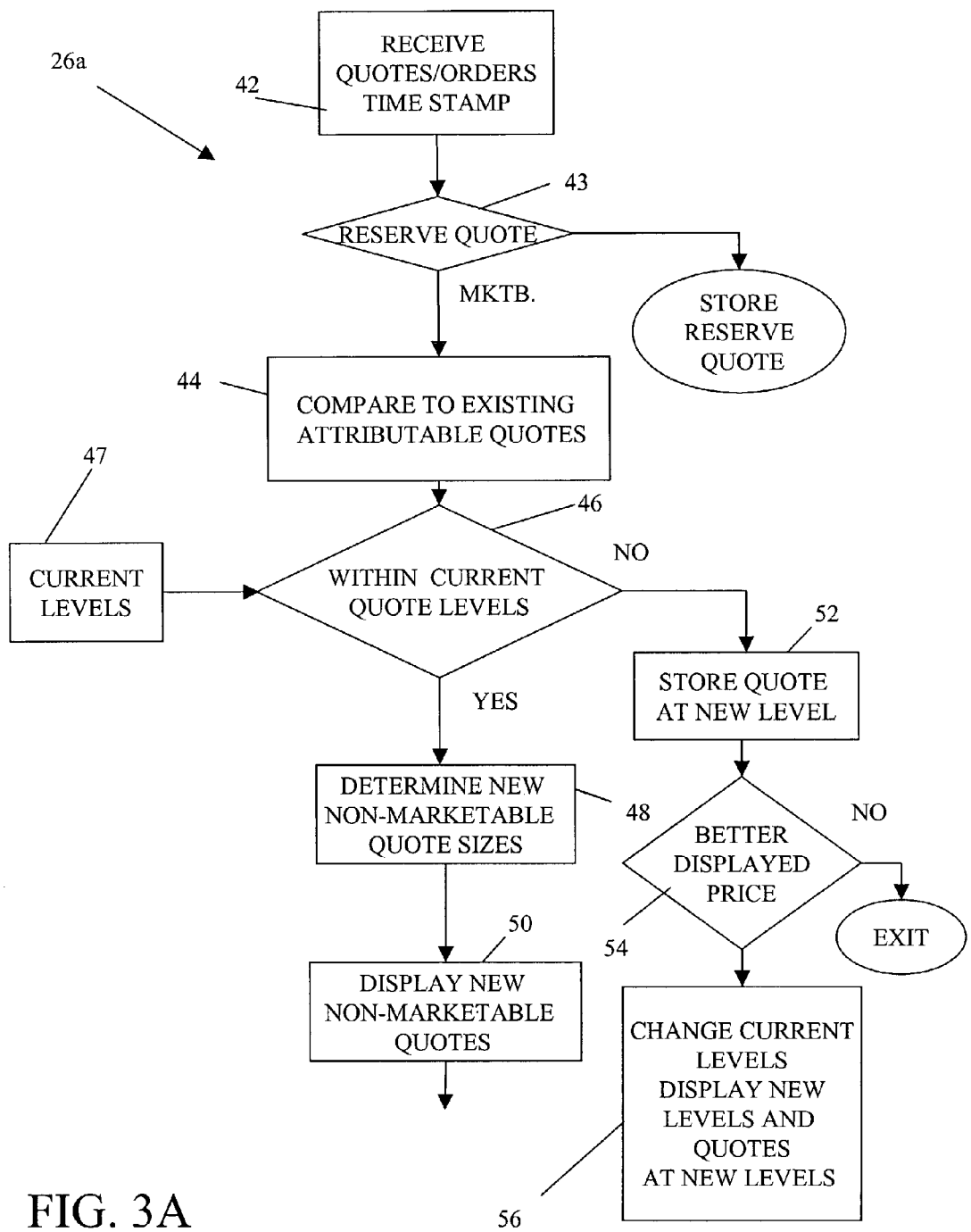
FIG. 3A is a flow chart showing a quote/order manager.

Referring to FIG. 3A, the quote/order manager 26*a* receives orders/quotes and time stamps 42 each order/quote upon receipt. This time stamp determines the order's/quote's ranking for interaction with incoming marketable orders. Quotes/orders are designated as either attributable or non-attributable, and could also have a reserve size discussed above. The quote/order manager 26*a* aggregates all of a Quoting Market Participant's attributable and non-attributable orders at a particular price level, and disseminates order/quotation information into the aggregate montage and/or the current quote montage, as will be discussed below.

The quote/order manager 26*a* determines 43 whether the received quote/order corresponds to a reserve quote. If the quote does not correspond to a reserve quote then the quote is a displayable quote that is attributable or non-attributable. The quote/order manager 26*a* compares 44 the received quotes/orders to existing quotes/orders to determine 46 whether the price of quotes/orders fall in existing quote/order price levels. Any number of quote/order price levels can be accommodated although, in this example, only three price levels will be displayable in the non-attributable i.e., aggregate montage. If the quote price is in a displayable price level it is a displayable quote eligible for automated execution. The order collector system 20 can be provided with more price level depth than the three levels, e.g., a depth of 20-25 levels although only a limited number, e.g., three would be displayed at any one time.

If the quote is within one of the pre-defined quote levels, the quote/order manager 26*a* determines 48 new non-marketable quote/orders sizes by adding the quote/order size corresponding to the received quote/order to quote sizes at that price level already in the system 20. The quote/order manager 26a will cause the new non-marketable quote sizes to be displayed 50. If the quote is not within one of the pre-defined quote levels, the quote/order manager 26a stores 52 the quote at a new price level determines 54 if it is at a better price. If the quote is at a better price, the quote/order manager 26a changes 56 current levels to cause a new price level for non-marketable quote sizes to be displayed 50.

Figure 3B:
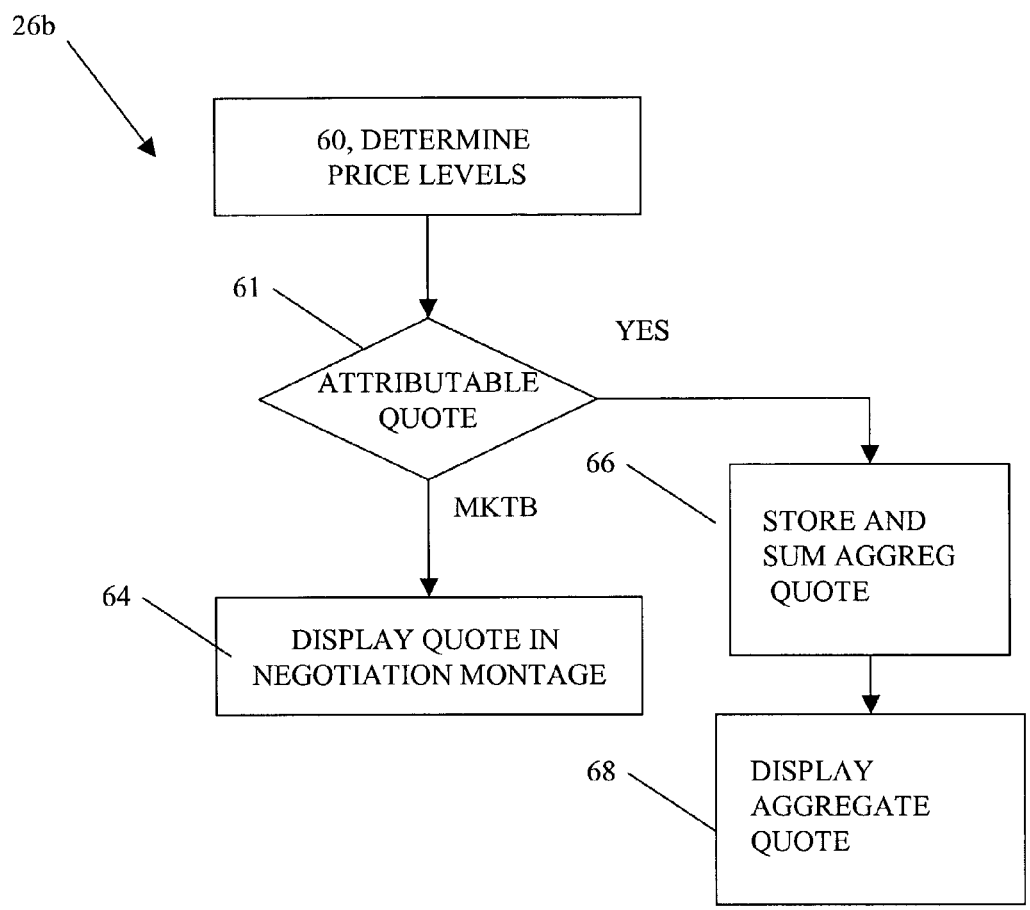
FIG. 3B is a flow chart showing a montage manager.

Referring to FIG. 3B, the montage manager 26b of the quote/order collector process 25 determines 60 which price levels to display 60 and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the three top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one unique market participant identification "MPID" and possibly an agency MPID against which they can display attributable quotes. If a market maker has an agency quote, attributable orders will be displayed once the order or orders at a particular price level become the market participant's best agency quote.

Nondirected Orders

A market participant can immediately access the best prices in system 20 as displayed in the aggregate montage, by entering a non-directed order into the OCF 25. A non-directed order is an order that is not sent/routed to a particular Quoting Market Participant. A non-directed order is designated as a market order or a marketable limit order and is considered a "Liability Order" and treated as such by the receiving market participant. Further, in some embodiments, the market 10 allows market participants that enter Non-Directed Orders three options as to how the order interacts with the quotes/orders in the system 20. These choices are that the orders can execute against displayed contra side interest in strict price/time; or price/size/time; or price/time that accounts for ECN access fees.

Upon entry, the OCF 25 will ascertain what market participant is the next Quoting Market Participant in queue to receive an order based on the entering MP's ordering choice, and depending on how that receiving Quoting Market Participant participates in system 20 (i.e., automatic execution v. order delivery), the OCF 25 will either cause delivery of an execution (via SOES$^{SM}$M) or delivery of a Liability Order (via SelectNet®).

Also in some arrangements, the market 10 can have a class of orders referred to as preferenced orders. A preferenced order is an order that is preference to a particular quoting market participant e.g., market maker or ECN. Preferenced Orders can be of two types price restrictions or no price restrictions. Preferenced Orders of either type are entered into the system 20 through the Non-Directed Order Process. The market participant entering the Preferenced Order designates the quoting market participant by its identification symbol ("MPID"). Preferenced Orders are processed in the same "queue" as Non-Directed Orders and are sent from the queue when the preferenced quoting market participant quote satisfies the order.

Order Execution Manager

Figure 4A:
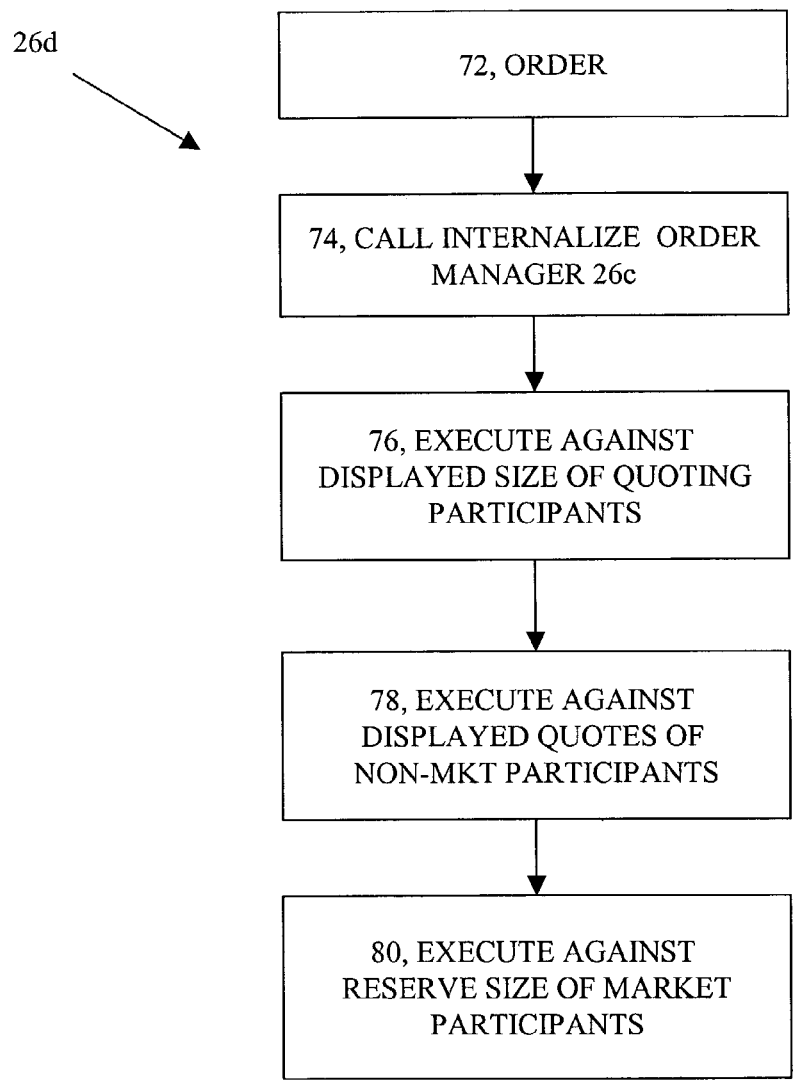
FIGS. 4A-4B are flow charts of an execution/routing manager.

Referring to FIG. 4A, an exemplary order execution/routing manager 26d executes non-directed orders against Quoting Market Participant's quotes/orders based on, e.g., price/time priority. As noted above, other priorities can be used and the execution/routing manager 26d would be so modified. Each quote/order when entered into the OCF 25 receives a time stamp. The order execution/routing manager 26d will deliver all orders at the best bid/best offer generally in strict time priority based on the time stamp of the order/quote, subject to the order execution choice preferencing features, and self matching feature, with the exception that order execution/routing manager 26d will first attempt to provide a match off of orders/quotes entered by a Quoting Market Participant if the participant is at the best bid/best offer by calling 74 an internal execution manager 26c. Thus, the order execution/routing manager 26d will call the internal order execution manager 26c to try to match off a Quoting Market Participant's orders and quotes that are in the system if the participant is at the BBO and receives a market or marketable limit order on the other size of the market. Calling the internal order execution manager 26c includes using an actual shares execution process shown in FIG. 5.

Generally, the order execution/routing manager 26d will attempt to execute 76 against all displayed size (attributable and non-attributable) at a particular price level for market participants such as market makers and ECN's. Executing against all displayed size uses an actual shares execution process shown in FIG. 5. There does not need to be an interval delay between the delivery of executions against a market maker's quote (assuming the market maker has size to access) because all Quoting Market Participants may quote their actual size and may give multiple orders and price levels. As shown herein the market maker proprietary orders receive preference over agency orders. However, preference could be given to agency orders before market maker orders.

Once displayed size in system 20 is exhausted, the order execution/routing manager 26d will attempt to access the quotes of UTP Exchanges. After accessing the displayed size of Quoting Market Participants and UTP Exchanges 78, order execution/routing manager 26d will attempt to execute 80 against the reserve size of Quoting Market Participants generally in price/time priority, subject to the exceptions noted above. Similar to execution against displayed interest, executing against reserve size uses the process shown in FIG. 5.

In an alternate arrangement, the order execution/routing manager 26d can distinguish between exchanges that support auto execution and exchanges that do not support auto execution giving preference for the former. Additionally, in such an embodiment, UTP exchanges can have reserve size and the system 20 can distinguish between exchanges that support auto execution and those ECN's, and then exchanges that do not support auto execution.

In another arrangement the order execution/routing manager 26d can first access quotes of market makers and auto-execution ECN's, next access quotes of market makers and ECN's for delivery of orders, then the reserve size of market makers and ECN's and UTP exchanges. Other arrangements priorities, etc. are possible taking into consideration how participants participate in the market 10, choices of how orders interact in the market 10, the system or customer choices.

Figure 4B:
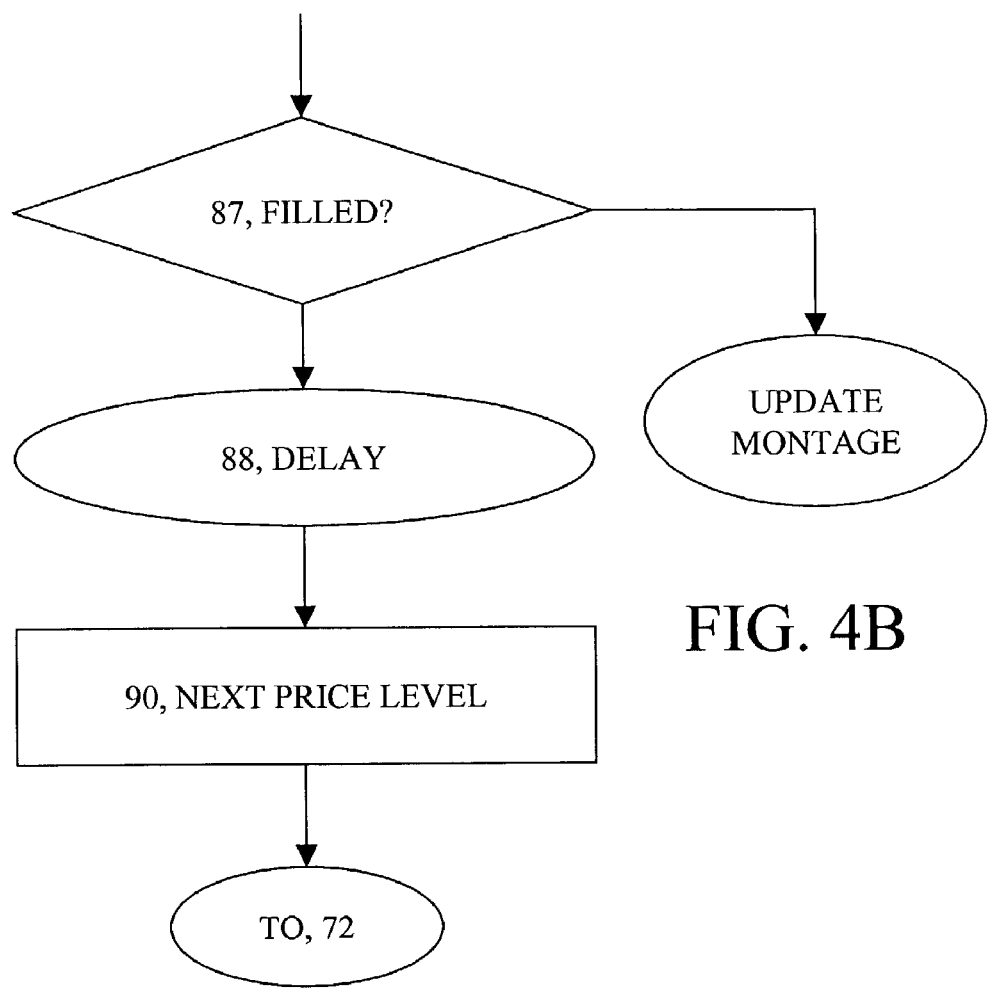

Referring to FIG. 4B, if the order is not filled 87, the order execution/routing manager 26d will move 90 to the next price level, immediately in one embodiment, or in another embodiment, after a predefined delay, e.g., a 5 second interval delay 88 before attempting to execute an order at the new price level. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility.

For non-directed orders that are mixed orders or odd lot orders the quote/order collector process 25 (FIG. 2B) executes these orders together with any round lot orders. As mentioned above, in FIG. 4A, prior to executing against the displayed size of quoting participants, the displayed size of non-market participants, or the reserve size of market participants, orders that include round, odd, and/or mixed lots are processed into an aggregate of shares.

Processing of Round Lots, Odd Lots, and Mixed Lots

Figure 5:
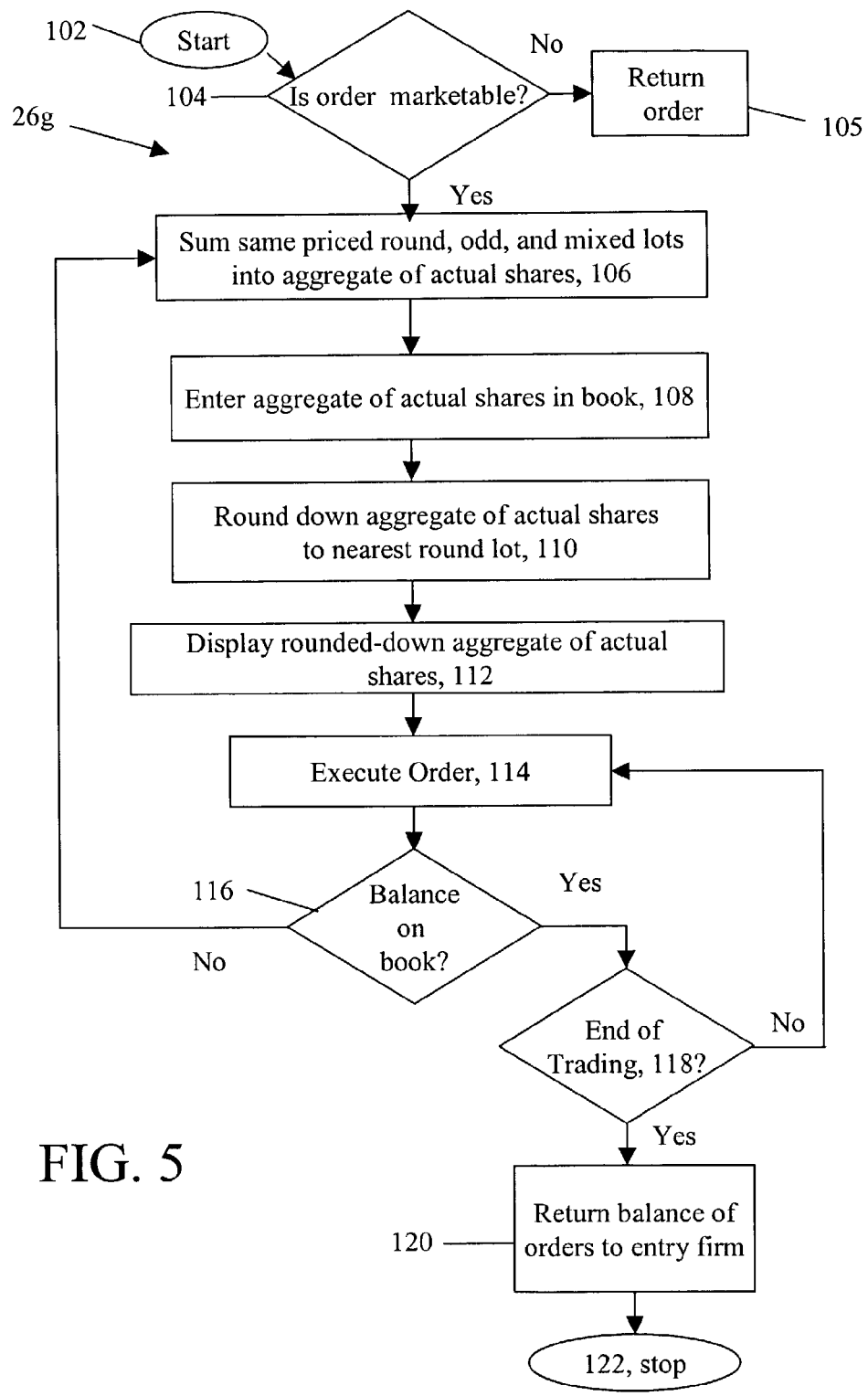
FIG. 5 is a flow chart showing an actual shares execution process.

Referring to FIG. 5, an actual shares execution process 26g, is shown. The execution process 26g accepts and executes orders that may include round lots, the typical normal unit of trading which is equal to a number of actual shares evenly divisible by 100 (e.g., 1 round lot=100 actual shares, 2 round lots=200 actual shares, 3 round lots=300 actual shares, etc.). The execution process 26g also accepts and executes orders that include odd lots, which is an order where the number of shares is less than the shares in a round lot (e.g., 97 shares), or mixed lots, which is an order where the number of shares is a combination of round and odd lots (e.g., 197 shares).

After starting 102, in some arrangements, the execution process determines 104 if the lot order is marketable. If it is marketable it is further processed otherwise it is returned to an entry firm 105.

If the received lots are marketable, the round, odd, and/or mixed lots with the same price are summed 106 into an aggregate of actual shares. For example, if 1 round lot (100 actual shares), a 50 share odd lot, and a 125 share mixed lot is received, the aggregate is 275 actual shares. By summing 106 the three types of lots, the aggregate of actual shares allows processing of all of the actual shares together in a lot-based system. Thus, a lot-based system can display quotes in units of round lots as required, to market participants, while processing orders in units of actual shares.

In comparison, ECN's do not operate as lot-based systems but as share-based systems. In other words, ECN's display quotes in units of shares, allowing displayed quotes to be less than a round lot. Thus, users familiar with lot-based systems may be confused when using an ECN because the share-based ECN's display quotes in shares while the lot-based systems display quotes in round lots.

After summing 106, the aggregate of actual shares is entered 108 into a book. Once on the book, orders may be executed against the aggregate of actual shares in any amount. After entering the actual shares in the book 108, the aggregate of actual shares is rounded down 110 to the nearest round lot equivalent for displaying. For example, an aggregate of 275 actual shares would round down to 200 shares or 2 round lots. By rounding down 110 to the nearest round lot, the aggregate of actual shares may be expressed in round lots for display in a round lot-based system. After rounding down 110, the rounded down aggregate is displayed 112, for example, with current display mechanisms. By aggregating all of the lots of equal price, the round lot-based system displays 112 as much round lot liquidity as possible.

Since round, odd, and mixed lots, with the same price, are processed together, the execution process 26g performs all of the execution rules, and separate processes are not required to keep track of odd and mixed lots. As a result there are fewer accounting complexities.

After entering the aggregate of actual shares in the book 108 and displaying the rounded-down aggregate of actual shares 112, an order may be executed 114 against the aggregate of actual shares. After executing any orders 114, the execution process 26g, determines if there is a balance of actual shares 116 on the book. If there is no remaining balance, the execution process 26g returns to summing any round, odd, and mixed lots into an aggregate of actual shares 106. If there is a balance on the book, the execution process 26g determines if trading 118 has ended. If trading has not ended the execution process 26g continues to execute 114 orders against the aggregate balance. If trading has ended, the execution process 26g returns 120 the remaining balance of day orders to the entry firm. A day order, which may include any of the order lot types, are held for execution until the close of the exchange at the end of the trading day. This typically occurs at the 4:00 pm closing of the exchange. However, Good-Till-Cancel (GTC) orders, which may also include round, odd, and/or mixed lot orders, can remain on the book after the 4:00 pm closing. With a valid life of about 6 months, GTC orders may remain on the book beyond a trading day. But once a GTC order has been on the book for 6 months, the GTC user is typically asked to reconfirm leaving this order on the book. After returning 120 any balance of orders, the execution process 26g stops 122.

As a demonstrative example, a market participant may enter an order containing 25 shares in an odd lot, 150 shares in a mixed lot, and 200 shares in a round lot, where all of the shares have the same price. Summing the order results in 375 actual shares that are entered into the book for execution against. As mentioned above, in order to display the aggregate of actual shares in round lots, the aggregate of actual shares are rounded down to the nearest round lot, which in this example is 300 shares or 3 round lots.

In this particular example, more shares were entered into the book (375 shares) than where displayed (3 round lots or 300 shares). Continuing with this example, an order for 400 shares is executed against these 375 shares on the book. Note, while only 3 round lots are displayed, the order executes against the entire 375 actual shares on the book. So, in this case execution will provide, to the order, the entire 375 shares on the book and, to complete the order, 25 shares will be "picked-up" during the next order in time priority sequence. Thus, the aggregation of equally-priced round, odd, and mixed lots are placed together on the book, and the entire aggregation is utilized in the same process and with the same time priority.

Since quotes are displayed in round lots, a non-displayed odd lot may be on the book with a better price than the displayed round lot. In this situation better-priced shares may be present on the book than the inside would indicate. Thus, non-displayed shares, with a price better than the displayed price, may be executed against. However, only a maximum of 99 of these "hidden" shares may be on the book since all equally-priced shares are aggregated prior to determining the display price. Thus, if multiple odd lots, of equally-priced shares, sum to more than 99 shares, the aggregate will produce a round lot and the round lot price will be displayed.

Also, in some arrangements, the actual shares execution process 26g can check if the eligible market participant can satisfy the order. If the eligible market participant cannot satisfy the entire order, the remaining balance of the order, if still marketable, will be executed against the next eligible market participant at that price. If there is not another eligible market participant at the inside price (all size at the inside price is exhausted), and the remaining balance is still marketable, then the balance is given for execution to the next eligible market participant at the new inside price. If the order is not marketable, or if there is not another eligible market participant the actual shares execution process 26g can cause the return of the remaining balance to the entry firm. Also, in some arrangements, odd lot and mixed lot orders are handled as immediate or cancel (IOC) orders.

In some arrangements, the actual shares execution process 26g can be used for odd lot and mixed lot executions against non-odd lot eligible ECN's that are at the inside price. The process may detect that an odd lot order was entered and determine that an ECN is next in line at the inside to receive the order. If there is not another odd lot eligible market participant at the is inside price, then the order is returned to the entry firm. Otherwise, the order can be executed against the next odd lot eligible market participant at the inside price.

Also, in some arrangements if a mixed lot market order is entered, and an ECN is next in line at the inside to receive the order, the actual shares execution process 26g may deliver the round lot portion to the ECN and give the remaining balance to the next eligible market participant at the inside price. If there is no eligible market participant at the inside and the ECN is still at the inside, the process 26g may return the remaining balance of the order to the entry firm. If there are no eligible market participants left at the inside price, the remaining balance may be given to the first eligible market participant at the new inside price.

In some arrangements a process similar to actual shares execution process 26g can be used with limit orders. If a mixed lot limit order is entered, and an ECN is next in line at the inside price to receive the order, the process may deliver round lot portions of the order to the ECN and give the remaining balance, if still marketable, to the next eligible market participant at the inside price. If no eligible market participant remains at the inside price, or the remaining balance is no longer marketable, the process may return the remaining balance of the order to the entry firm.

Figure 6:
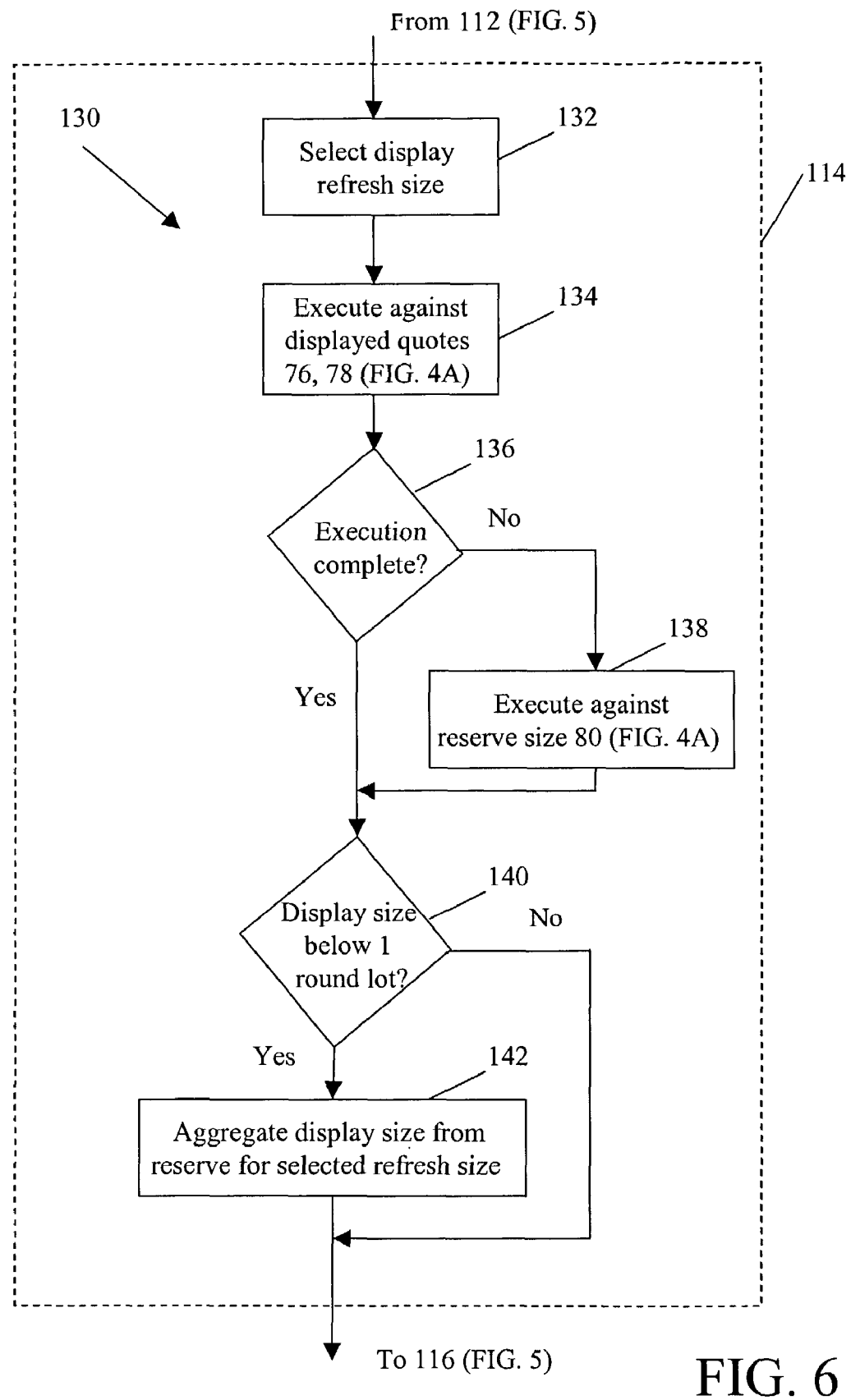
FIG. 6 is a flow chart showing an execution/refresh process.

Referring to FIG. 6, in some arrangements, executing an order 114 (also shown in FIG. 5) can include executing an execution/refresh process 130 that replenishes the size of the displayed order or quote to one or more round lots. After the rounded-down aggregate of actual shares is displayed 112 (shown in FIG. 5) the process 130 asks the market participant that provided the quote (e.g., a market maker, ECN, etc.) to select 132 a size to replenish the displayed quote if the size of the displayed quote falls below 1 round lot (i.e. 100 shares). In some arrangements this selection may be accomplished by the market participant at any point in the quote/order collector process 25 (shown in FIG. 2B). But for this particular example, the selection is made in the execution/refresh process 130. In general, the selected refresh size is 1 round lot or a multiple of 1 round lot (e.g., 2 round lots, 3 round lots, 4 round lots, etc.). In shares, this selection maps to refresh sizes of 100 shares or a multiple of 100 shares (e.g., 200 shares, 300 shares, 400 shares, etc.).

After the market participant has selected 132 the refresh size, the process 130 executes 134 an entered order against interest in the market such as the displayed quotes of quoting participants 74 (shown in FIG. 4A) and/or against the displayed quotes of non-market participants 78 (also shown in FIG. 4A). After executing 134 the order, the process 130 determines 136 if the order has been completely exhausted by executing against the displayed quotes. If the order is not completely exhausted, the process 130 executes 138 the remaining portion of the order against the quote reserve size of the market participants 80 (shown in FIG. 4A). After executing against the quote reserve size 138, if necessary to exhaust the order, or after exhausting the order against the quote display size 134, the process 130 determines 140 if the displayed quote size is below 1 round lot (i.e., 100 shares). If the quote display size is below the 1 round lot the process 130 aggregates 142 the quote display size with reserve shares such that the quote display size is equal to the selected display size 132 in round lots. After the process 130 aggregates 142 the quote display size to the selected round lot amount, the process continues with the actual shares execution process 26g (shown in FIG. 5).

As a demonstrative example, if a market maker is displaying 1000 shares in a particular quote and 2000 shares placed in reserve. If an order for 960 shares is received, the order is executed against the 1000 shares displayed by the execution/refresh process 130 and 40 displayed shares remain unexecuted. Prior to the execution, the market maker selected that the displayed quote is to be refreshed to 5 round lots (i.e., 500 shares) if the number of displayed shares drops below 1 round lot (i.e., 100 shares). So, for this particular example, the process 130 aggregates the remaining 40 shares with 460 shares, which are removed from the 2000 shares in the market maker reserve for this security, and the amount of displayed shares is 500 shares (i.e., 5 round lots).

In some arrangements, the execution/refresh process 130 aggregates the remaining shares with the selected size. Thus, the resulting aggregate that is displayed may be an odd lot (i.e., less than 100 shares) or a mixed lot (i.e., aggregate of an odd lot and a round lot). Using the example from above, after the 960 share order executes against the market maker's displayed quote of 1000 shares, there are still 40 displayed shares remaining unexecuted. However, in this particular arrangement the selected refresh amount of 500 shares aggregate with the remaining 40 shares to produce a mixed lot of 540 shares that is displayed as the quote for the market maker. Thus in this arrangement, once a displayed quote or order decreases to a size that is less than 1 round lot, the process 130 aggregates the displayed quote or order with the selected refresh size from the reserve.

The execution/refresh process 130 (shown in FIG. 6) described herein is not limited to the software embodiment described above; it may find applicability in any computing or processing environment. The execution/refresh process may be implemented in hardware, software, or a combination of the two. For example, the execution/refresh process may be implemented using circuitry, such as one or more of programmable logic (e.g., an ASIC), logic gates, a processor, and a memory.

The execution/refresh process may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the execution/refresh process. The execution/refresh process may also be implemented as a machine-readable storage medium, configured with a computer program, where, upon execution, instructions in the computer program cause a machine to operate to perform the functions of the execution/refresh process described above.

Embodiments of the execution/refresh process may be used in a variety of applications. Although the execution/refresh process is not limited in this respect, the execution/refresh process may be implemented with memory devices in microcontrollers, general purpose microprocessors, digital signal processors (DSPs), reduced instruction-set computing (RISC), and complex instruction-set computing (CISC), among other electronic components.

Embodiments of the execution/refresh process may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer implemented method for managing display of quotes for securities in an electronic trading venue, the method comprises:
   receiving a quote from one of a plurality of market participants for a security by a computer system, a first portion of the quote displayable to participants in the electronic trading venue and a second, different portion of the quote being held as reserved quote interest that is not displayable to participants in the electronic trading venue;
   receiving results of executing by a computer of a portion of the displayable quote portion against contra-side interest in the trading venue, with executing occurring at a price corresponding to an inside market for the security in the electronic trading venue;
   determining that a size value of the displayable portion of the portion of the quote after execution is either a mixed lot or an odd lot size;
   automatically aggregating by the computer when the determined size is an odd lot or a mixed lot size the unexecuted displayable quote portion with a portion of the reserved quote at the price corresponding to the inside market to provide the unexecuted displayable quote portion with a size equal to one or more whole round lots; and
   generating by the computer a user interface for displaying the unexecuted, displayable portion as at least one or more integer multiples of a round lot to the participants in the electronic trading venue.

2. The method of claim 1 wherein the unexecuted displayable quote portion that is aggregated with the portion of the reserved quote to provide the displayable quote portion with a specific size is determined by an entity that entered the quote prior to execution of the displayable quote against interest in the electronic trading venue.

3. The method of claim 2 wherein the unexecuted displayable quote portion is aggregated with a portion of the reserve quote to the displayable portion with the specific size that is a specific number of round lots.

4. The method of claim 1 wherein the portion of the reserve quote aggregated against the displayed portion is less than a round lot.

5. The method of claim 1 wherein the determined size is a odd lot.

6. The method of claim 1 wherein the determined size is a mixed lot.

7. The method of claim 1 further comprises:
   repeating the aggregating and generating, until the entire quote has been exhausted.

8. The method of claim 1 further comprises:
   executing a portion of the reserved quote portion against interest in the electronic trading venue if the displayable quote portion is exhausted.

9. The method of claim 1 wherein the refresh size from the reserve quote is an amount to provide the displayable quote as one or more round lots.

10. A computer program product tangibly embodied on a non-transitory computer readable medium comprises instructions for managing display of quotes for securities in an electronic venue for trading of securities, the instructions cause a computer to:
    receive a quote for trading of a security, a first portion of the quote displayable to participants in the electronic venue and a second, different portion of the quote being held as reserved quote interest that is not displayable to participants in the electronic venue;
    receive results of execution of a portion of the displayable quote portion against contra-side interest in the venue for the security, with the execution occurring at a price corresponding to an inside market for the security in the venue;
    automatically aggregate an unexecuted displayable quote portion, with a portion of the reserved quote at the price corresponding to the inside market, when the unexecuted displayable quote portion is less than a round lot; and
    generate a user interface to display the unexecuted, displayable portion as at least one or more integer multiples of a round lot to the participants in the electronic venue.

11. The computer program product of claim 10 wherein the unexecuted displayable quote portion is aggregated with a portion of the reserved quote to provide the displayable quote portion with a specific size that is determined by an entity that entered the quote prior to execution of the displayable quote against interest in the electronic trading venue.

12. The computer program product of claim 11 wherein the unexecuted displayable quote portion is aggregated with a portion of the reserve quote to the displayable portion with the specific size that is a specific number of round lots.

13. The computer program product of claim 10 wherein the portion of the reserve quote aggregated against the displayed portion is less than a round lot.

14. The computer program product of claim 10 wherein the unexecuted portion is an odd lot.

15. The computer program product of claim 10 wherein the unexecuted portion is a mixed lot.

16. The computer program product of claim 10 further comprising instructions to cause the computer to:
    repeat instructions to aggregate and generate until the quote has been exhausted.

17. The computer program product of claim 10 further comprising instructions to cause the computer to:
    execute a portion of the reserved quote portion against interest in the electronic trading venue if the displayable quote portion is exhausted.

18. The computer program product of claim 10 wherein the refresh size from the reserve quote is an amount to provide the displayable quote as one or more round lots.

19. A computer system for managing display of quotes for securities in an electronic venue for trading of securities, the computer system comprising:
    a processor;
    memory; and a computer readable medium storing a computer program product comprising instructions for managing the display of quotes, the instructions causing the computer system to:

receive a quote for trading of a security, a first portion of the quote displayable to participants in the electronic venue and a second, different portion of the quote held as reserved quote interest that is not displayable to participants in the electronic venue;

receive results of an execution of a portion of the displayable quote portion against contra-side interest in the electronic venue for the security, with the execution occurring at a price corresponding to an inside market for the security in the electronic venue;

automatically aggregate an unexecuted displayable quote portion, with a portion of the reserved quote at the price corresponding to the inside market, when the unexecuted displayable quote portion is less than a round lot or includes a mixed lot portion; and generate a user interface to display the unexecuted, displayable portion as at least one or more integer multiples of a round lot to the participants in the electronic venue.

20. The computer system of claim 19 wherein the unexecuted displayable quote portion is aggregated with a portion of the reserved quote to provide the displayable quote portion with a specific size that is determined by an entity that entered the quote prior to execution of the displayable quote against interest in the market.

21. The computer system of claim 20 wherein the unexecuted displayable quote portion is aggregated with a portion of the reserve quote to the displayable portion with the specific size that is a specific number of round lots.

22. The computer system of claim 20 wherein the portion of the reserve quote aggregated against the displayed portion is less than a round lot.

23. The computer system of claim 19 wherein the unexecuted portion is an odd lot.

24. The computer system of claim 19 wherein the unexecuted portion is a mixed lot.

25. The computer system of claim 19 further comprises instructions to:

repeat execution of the aggregate and generate instructions until the quote has been exhausted.

26. The computer system of claim 19 further comprises:

instructions to execute a portion of the reserved quote portion against contra-side interest in the electronic venue if the displayable quote portion is exhausted.

27. The computer system of claim 19 wherein the refresh size from the reserve quote is an amount to provide the displayable quote as one or more round lots.

28. The method of claim 1 wherein the electronic trading venue is selected from the group consisting of an exchange, a market and a matching network.

29. The computer program product of claim 10 wherein the electronic trading venue is selected from the group consisting of an exchange, a market and a matching network.

30. The computer system of claim 19 wherein the electronic venue is selected from the group consisting of an exchange, a market and a matching network.

* * * * *